Aug. 24, 1937.  H. J. L. FRANK ET AL  2,090,725
ELECTRICAL DISTRIBUTION SYSTEM
Original Filed Nov. 12, 1934  3 Sheets-Sheet 1
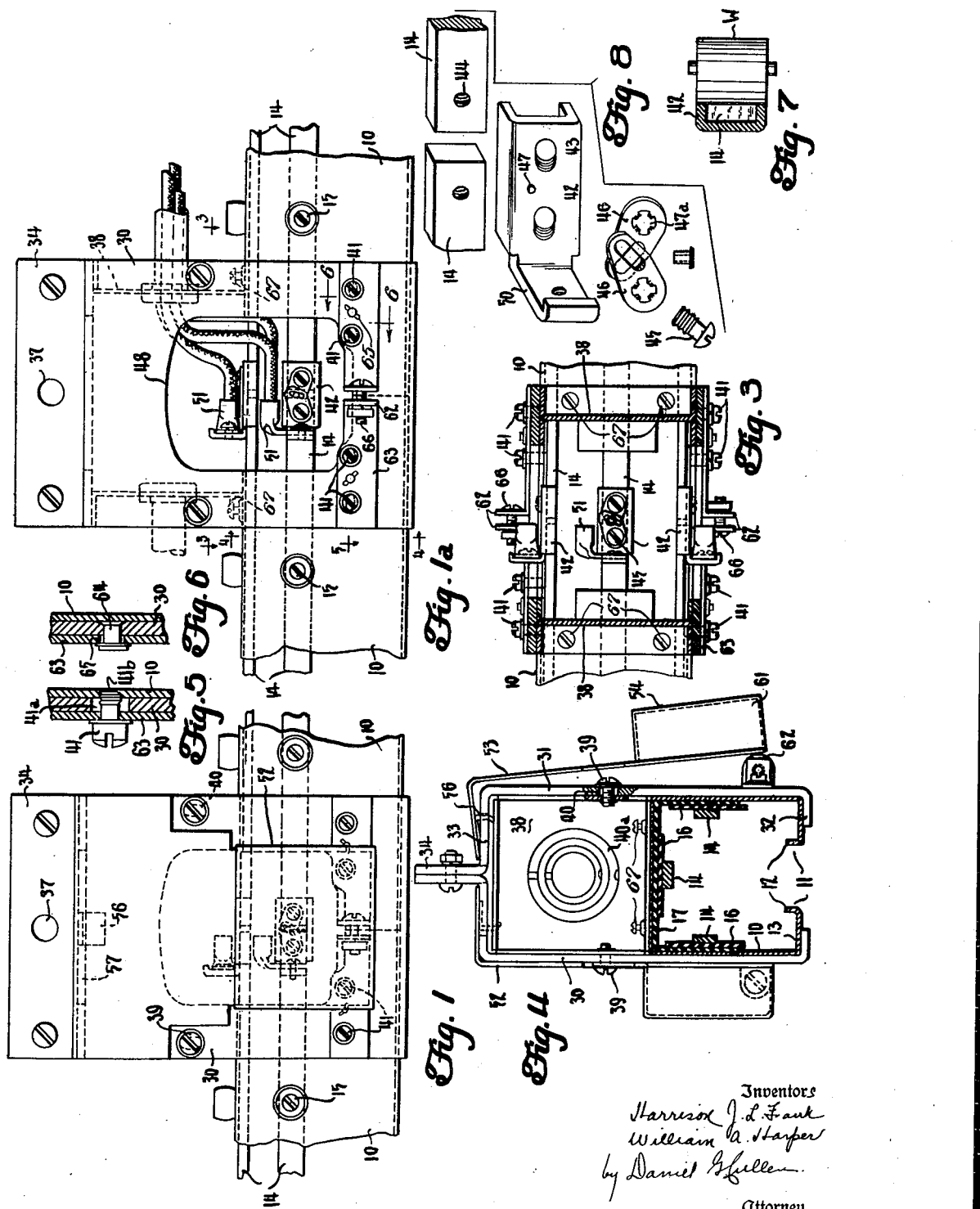
Inventors
Harrison J. L. Frank
William A. Harper
by Daniel G. Cullen
Attorney

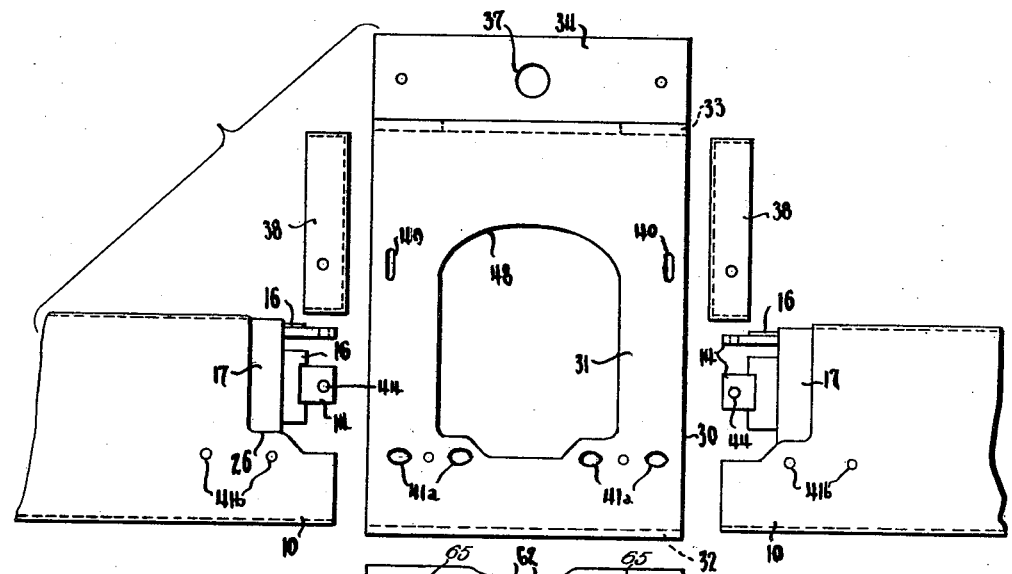

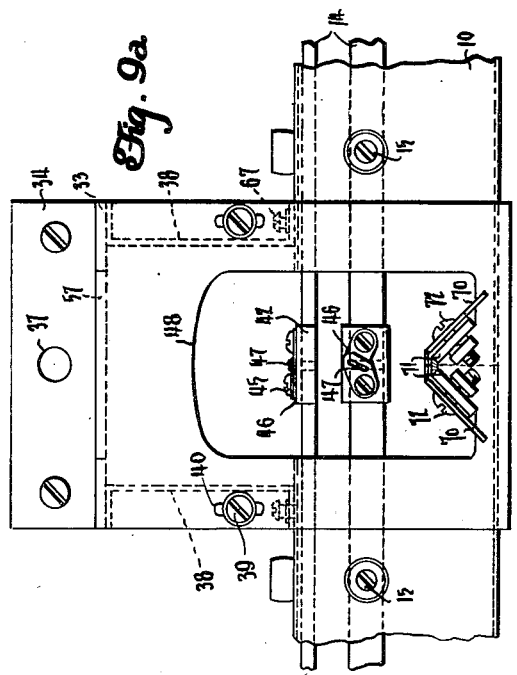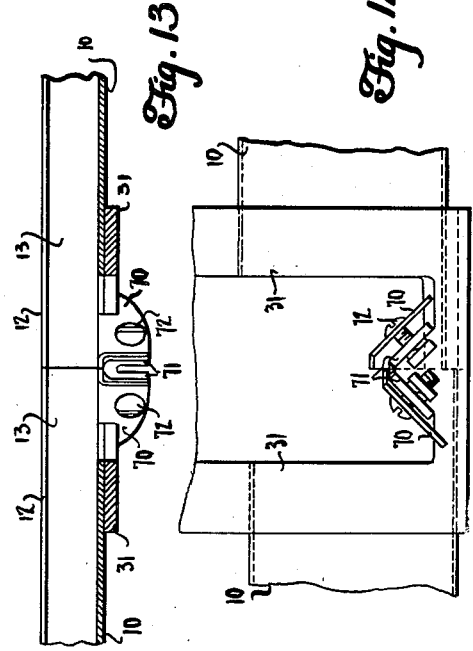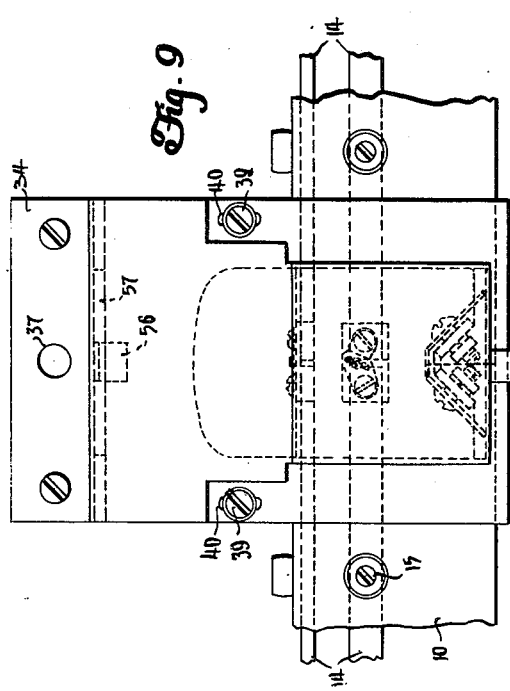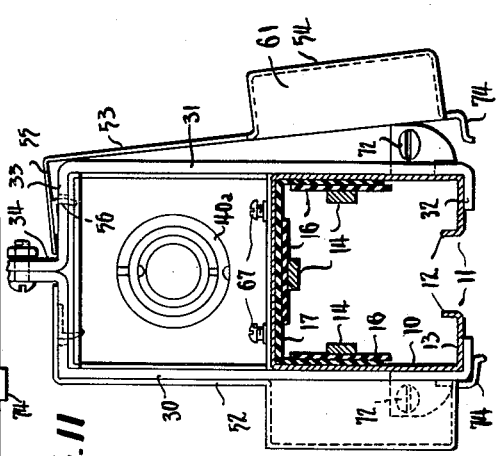

Patented Aug. 24, 1937

2,090,725

UNITED STATES PATENT OFFICE 2,090,725

ELECTRICAL DISTRIBUTION SYSTEM

Harrison J. L. Frank and William A. Harper, Detroit, Mich., assignors to Bulldog Electric Products Company, Detroit, Mich., a corporation of West Virginia Original application November 12, 1934, Serial No. 752,576. Patent No. 2,042,778, dated June 2, 1936. Divided and this application January 10, 1936, Serial No. 58,604

10 Claims. (Cl. 247—3)

This application relates to electrical distribution systems of the trolley and trolley duct type, and more particularly to the stationary or trolley duct parts thereof, and specifically relates to aligning means formed as parts of duct section junctures, hangers, and cable connection boxes, in trolley duct installations. This application is a division of application Serial No. 752,576, filed November 12, 1934, now Patent No. 2,042,778 of June 2, 1936.

In the above mentioned application there is disclosed, in connection with trolley duct construction, a duct section juncture-hanger-cable connection box. This application discloses, in connection with such a structure, details of construction for adjusting and aligning duct section ends and particularly track portions thereof with respect to each other. While it is contemplated that the construction of the aforementioned patent is such that the alignment between duct section ends and track portions thereof is approximated, by virtue of the fact that the duct sections are joined at the points where they are hung, nevertheless it has been found in practice that the alignment of these parts is not exact, inasmuch as no fine adjustment means are provided. The novel details of construction herein disclosed provide a fine adjustment for the parts whereby more nearly exact alignment is approximated.

For an understanding of the structures of this application reference may be had to the appended drawings showing two different forms of juncture means and details thereof. In these drawings, Fig. 1 shows in side elevation two ends of duct sections, joined to each other by one form of juncture means, the latter being so constructed as to provide a duct hanger and a cable connection box; and also as to insure accurate alignment of duct section ends;

Fig. 1a is a similar view but with a hanger cover plate removed to expose interior parts of the juncture;

Fig. 2 is an exploded side elevational view of the two section ends and the juncture parts, taken from Fig. 1;

Figs. 3–6 are sections as if on corresponding lines of Fig. 1a;

Fig. 7 is a detail view showing the relation between the dimensions of a bus bar coupling and a contact roller of a trolley for use with the trolley duct here shown;

Fig. 8 is an exploded perspective view of parts for joining two ends of bus bar lengths;

Figs. 9, 9a, 10, and 11 are views like Figs. 1, 1a, 2, and 4 of a second form of juncture means;

Fig. 12 is a fragmentary view showing the operation of a means for properly aligning duct section ends;

Fig. 13 is a view as if looking down on Fig. 12.

Referring to the drawings, it will be seen that the duct is assembled from a number of duct sections joined to form a continuous duct.

The sections include sheet metal casings 10 of substantially rectangular cross section and having their lower, or bottom, walls provided with slots or openings 11 which provide external access for the trolleys or collectors used in conjunction with the duct.

The edges of the bottom wall openings 11 are turned upwardly, as at 12, to form vertical flanges, bounding the opening 11, and rigidifying the parts 13 of the bottom wall, which parts form rails or tracks for the riding wheels of the trolleys or collectors.

In the multiphase form shown, where three bus bars 14 are provided, the three bus bars will preferably, though not necessarily, be positioned on the three walls of the casing other than the bottom wall, and will be held in place against these walls of the casing by means of insulated screw bolts 15, which pass through holes in the walls and which are threaded into tapped holes of the bus bars, it being understood that the bus bars and the sheet metal casing are initially provided with these holes, for the reception of these screws, at suitable and uniformly spaced intervals. The bus bars are insulated from the sheet metal casing walls by insulating strips 16, of which there is one for each bus bar, and by means of a channel-shaped sheet of insulation 17, of which there is one for each duct section.

Each duct section has two ends and these ends are preferably duplicate in all respects. An end construction will now be described with particular reference to Fig. 2.

As shown in this figure, each end of the sheet metal casing 10 is cut away on the top wall, and on the two side walls, to a point about two-thirds down from the top of the casing, the line of cut for this cutaway being referenced 26. The insulating channel 17 projects beyond the major part of the cut line 26, as indicated, but does not project beyond the end of the casing section 10. Similarly, the insulating strips 16 are permitted to project slightly beyond insulation 17 but do not project beyond the end of the casing section 10. The bus bars 14 project beyond the insulation 16 and 17 and terminate at the end of the casing section 10, all substantially as indicated in Fig. 2.

Section ends are joined to each other by a juncture and hanger construction, as shown. Each hanger includes two bent hanger plates 30 which embrace the section ends so as to enclose and support the same. These hanger plates have vertical plate parts 31 whose lower edges are laterally bent to form supporting flanges 32 and whose upper edges are laterally and then vertically bent, as at 33—34, the last mentioned portions being secured to each other and to fixed structure by bolts passed through the aligned holes 37, of the hanger plates.

Additional ties between the hanger plates 30 are provided by plates 38 having marginal flanges into which are tapped screws 39 passing through clear slots 40 of the hanger plates, the plates 38 forming end enclosures for the connection space above the duct within the hanger plates. These plates 38 are provided with knock-outs 40a which may be removed to permit the entrance of a cable into the connection space within the hanger plates and above the duct, substantially as shown in Fig. 1a.

When an assembly between the end of a previously mounted section and the end of one that is to be mounted is to be effected, a socket is formed on the end of the mounted section by the hanger plates 30 that are secured to that end of the previously mounted section by means of screws 41 passing through clear slots 41a of the hanger plates and tapped into threaded holes 41b of the duct sections (Fig. 5), which screws, it is observed, are considerably below the bus bars 14, and which screws do not project into the duct. Into the socket thus formed is thrust and and is similarly fastened the end of the section that is to be mounted.

After this is done, the adjacent bus bar ends are secured to one another by means of the bus bar connections. The adjacent ends of the bus bars are received within channelled copper connectors 42 whose slots 43 align with tapped holes 44 of the bus bars, and screws 45 pass through the slots 43 into holes 44, the heads of the screws bearing against lock washer plates 46, which are loosely riveted, at 47, to the connectors 42, these washer plates having notched holes 47a for holding the screws 45 non-removable, though loosely movable, with respect to the connectors 42. It will be observed that the connections between the bus bar ends are such that no humps or gaps at the ends are produced, on the inside surfaces of the bus bars, to interfere with smooth rolling of collector wheels W along the run. It will also be observed from Fig. 7 that the connectors 42 and the wheels W are wider than the bus bars, so that the wheels will ride along the edges of the connectors 42 smoothly, despite the presence of any gaps that might exist between adjacent ends of bus bar sections.

The connectors 42, as will be seen, dispose themselves on the outside surfaces of the bus bars, in cutouts or openings 48 of the hanger plates. These cutouts also permit the manipulations necessary to secure and connect the bus bar ends.

It will also be observed that the connectors 42 may be and preferably are provided with lugs 50 to which may be connected cable terminal lugs 51, whereby cables introduced into the connection box through the knock-outs 40a may be physically and electrically connected to the bus bars, with the cutouts or openings 48 of the hanger plates affording access to the screws 51a which connect the cable terminal lugs 51 to the connector lugs 50 of the connectors 42.

To cover these cutouts or holes, hanger cover plates are provided. These cover plates, of which there are two, one for each hanger plate 30, are referenced 52 and include upper portions 53 and lower portions 54. The upper portions 53 are in the nature of vertical plates provided with horizontal flanges 55 having tongues 56 received in slots 57 of the portions 33 of the hanger plates, to form pivotal mountings for the cover plates.

The lower portions 54 of the cover plates include vertical plates provided with flanged edges 61. The cover plate parts 54 align with the holes 48 in the adjacent hanger plates and cover them, the parts 54, however, being spaced from the hanger plates 30 by the flanged edges 61 of the cover plate to provide air chambers around the live ends of the bus bars.

The lower edges 61 of the cover plates frictionally engage the lower surfaces of lugs 62 formed on pull plates 63 lying adjacent the hanger plates, and the frictional engagement thus provided, together with the interlock provided by tongues 56 and slots 57, adequately latches the cover plates in position on the hanger plates.

The pull plates 63 are held onto the hanger plates by the screws 41 threaded into the duct and by pins 64 riveted to the hanger plates and passing through closely dimensioned inclined slots 65 of the plates 63. Through the lugs 62 of the plates 63 pass bolts 66, which, when tightened up, pull the adjacent ends of duct sections towards each other; and, by virtue of the fact that the slots 65 in the plates 63 are inclined, also bias the adjacent ends of the duct sections downwardly towards the lower portions of the hanger plates, as well as towards each other, to insure accurate alignment of duct section ends with respect to each other. Push screws 67 threaded in the lower marginal edges of plates 38 abut the top surfaces of the duct sections and also serve to bias them towards the lower portions of the hanger plates, when threaded down.

*The installation of a duct run*

When a duct run installation is to be effected, the first thing that is done is to install and support the end or first hanger of the series of hangers in a proper and desired location with reference to the building in which the duct run is to be installed. This hanger forms a socket into which may be thrust an end of the first duct section to be installed, and the first hanger will support this end during the time that the installer is lifting the other end and placing on the same the second hanger of the series, after which the installer can raise the second hanger and the second end of the first duct section and support the second hanger with respect to the fixed structure in its proper location. Thus is supported and installed the first section of the duct run.

At this time the installer will thread in screws 41 tightly to support the duct with respect to the hangers firmly, and will tighten up screws 66 and 67 to jam the duct end firmly against the bottom portion 32 of the hanger plates of the first hanger.

If desired, the installer may at this time bring in a cable feed through the opening 48 of the hanger plates and may connect the cable feed to the first duct section at the first hanger.

He will then mount cover plates 52 on the first hanger and this will complete the installation of the parts at the first hanger.

The installer will then go to the second hanger of the duct and thread the screws 41 inwardly but not tightly. This will adequately secure the second end of the first duct section with respect to the second hanger. Since the second hanger forms a socket, the installer may insert therein the first end of the second duct section. Then he may perform on the second end of the second duct section operations like those he had previously performed on the second end of the first duct section, thus hanging the second duct section.

Then he will go back to the second hanger and connect the bus bars of the first duct section to those of the second duct section and also tighten up the screws 41, 66, and 67 to connect the bus bars and secure the first end of the second duct section properly and tightly with respect to the second hanger.

Then at the second hanger he will snap on the cover plates 52 of that hanger. He will then repeat the operations for the complete duct run.

It will thus be observed that the installation of a complete duct run can be effected by one man, as contradistinguished from present contemplated systems where installation of a sectional duct run requires the presence of two men.

It will also be observed that a duct section may be dropped out from a duct run, in case it is defective, without disturbing any of the duct run except for the one section that is to be dropped out. This contradistinguishes the instant system from systems where it is necessary to remove a number of duct sections in order to drop out an intermediate one. It will be observed that in dropping out a duct section it is necessary merely to loosen certain of the screws at the hangers at the ends of the duct section involved, spread the hangers sufficiently to permit the removal of the defective duct section, and then remove the defective duct section. A non-defective duct section may be inserted into the place formerly occupied by the section removed, and the operations of mounting the non-defective duct section may be accomplished easily and readily and in a manner that can clearly be observed.

It will also be observed that the screws which are manipulated during mounting and dismounting of duct sections, namely, screws 45 and 41, can be manipulated without danger of their being dropped from the duct run. Lock washer plates 46 secure screws 45 against danger of dropping from the run, and the pull plates 63 secure screws 41 against the danger of dropping from the run.

It will also be observed that the feature of having one structure function as a duct juncture as well as a duct hanger is instrumental in promoting the success of a duct run built up of sections such as those shown. Experience indicates that in a sectional duct run installation the presence of misaligned joints leaves cracks and bumps which eventually impairs the efficiency of the trolleys used with the run, and further causes arcing of the bus bars and collectors at the junctures. By virtue of the fact that the duct juncture means also are duct hanger means, alignment of the adjacent duct section ends is automatically assured and continuously maintained, with a consequent increase in the satisfactory performance of the duct run.

It will also be observed that the hanger construction shown is useful not only as a hanger for duct sections at the ends thereof, but may also be used as a hanger for a duct section intermediate the ends of that section. Each hanger is in the nature of a split socket which can be placed around a duct section intermediate its ends, and then secured to fixed structure to form a satisfactory hanger for a duct section intermediate the ends thereof.

Under such circumstances the bolts in holes 37 and the screws 39 and plates 38 function to tie the hanger plates to each other and form a rigid socket, partially surrounding and embracing the duct section, and tightening of the screws 66 and 67 also operates to maintain a tight engagement between duct parts and the hanger. Screws 41 will of course, under such circumstances, not be threaded into the duct.

The construction of Figs. 9–13

The construction of these figures in general resembles the construction of Figs. 1–8 inclusive, but differs therefrom in slight details.

In this construction the duct section ends are formed with lugs 70 inclined as shown to cooperate with similarly positioned lugs 71 on the hanger plates 30, and through the corresponding pairs of lugs pass bolts 72 which may be tightened up to draw the duct section ends towards each other and also towards the lower portions 32 of the hanger plates for insuring accurate alignment of duct section ends with respect to each other.

The constructional details just described constitute an alternative to the constructional details respresented by the pull plates 63 and their screws 66, 41, and pins 64 of the construction of Figs. 1–8 inclusive.

It will also be observed that the cover plates 52 are provided with lugs 74 on their lower flanges 61 which engage the lower portions 32 of the hanger plates 30 frictionally to form a friction latch for the cover plates, and this construction is intended as an alternative to the construction of Figs. 1–8, where the lower flanges 61 of the cover plates engage the lower surfaces of the lugs 62 formed on the pull plates 63 for frictional latching of the cover plates with respect to the remainder of the juncture.

We claim:

1. An electrical distribution trolley duct run comprising neighboring, track-providing, duct sections disposed in end to end relation, bus bars therein and coterminous therewith, with the bus bars of neighboring sections disposed in end to end relation and meeting at duct section meetings, bus bar juncture means at the duct section meetings, multipart duct hangers bridging the meeting ends of said duct sections and having means cooperating with said duct sections for drawing together said duct section ends and for moving the meeting ends in one direction transverse to the longitudinal axis of the duct run to insure accurate alignment of the tracks thereof in that direction, and means for connecting the parts of the hangers and for moving the meeting ends in another direction transverse to the longitudinal axis of the duct run and thus insuring accurate alignment of the tracks in the last mentioned direction.

2. An electrical distribution trolley duct run comprising neighboring, track-providing, duct sections disposed in end to end relation, bus bars therein and coterminous therewith, with the bus bars of neighboring sections disposed in end to end relation and meeting at duct section meetings, bus bar juncture means at the duct section meetings, duct hangers bridging the meeting ends of said duct sections and having means cooperating with said duct sections for drawing together said duct section ends and for simultaneously moving the meeting ends in a direction transverse to the longitudinal axis of the duct run to insure accurate alignment of the tracks thereof in that direction.

3. An electrical distribution trolley duct run comprising neighboring, track-providing, duct sections disposed in end to end relation, bus bars therein and coterminous therewith, with the bus bars of neighboring sections disposed in end to end relation and meeting at duct section meetings, bus bar juncture means at the duct section meetings, duct hangers supporting the meeting ends of said duct sections and having means cooperating with said duct sections for drawing together said duct section ends and for moving the meeting ends in one direction transverse to the longitudinal axis of the duct run to insure accurate alignment of the tracks thereof in that direction, and means for connecting the parts of the hangers and for moving the meeting ends in another direction transverse to the longitudinal axis of the duct run and thus insuring accurate alignment of the tracks in the last mentioned direction.

4. An electrical distribution trolley duct run comprising neighboring, track-providing, duct sections disposed in end to end relation, bus bars therein and coterminous therewith, with the bus bars of neighboring sections disposed in end to end relation and meeting at duct section meetings, bus bar juncture means at the duct section meetings, duct hangers supporting the meeting ends of said duct sections and having means cooperating with said duct sections for drawing together said duct section ends and for simultaneously moving the meeting ends in a direction transverse to the longitudinal axis of the duct run to insure accurate alignment of the tracks thereof in that direction.

5. A sectional trolley duct installation comprising trolley duct sections and combined couplers and hangers for adjacent ends of duct sections, each coupler being provided with means manipulable for pulling adjacent section ends towards each other and means operating automatically on manipulation of the first mentioned means for causing the section ends to move transversely of the run of the duct and in the same direction towards a part of the coupler and thus automatically cause exact alignment of the section ends when they are coupled.

6. A sectional trolley duct installation comprising trolley duct sections and combined couplers and hangers for adjacent ends of duct sections, each coupler being provided with means manipulable for pulling adjacent section ends towards each other and means operating automatically on manipulation of the first mentioned means for causing the section ends to move transversely of the run of the duct and in the same direction towards a part of the coupler and thus automatically cause exact alignment of the section ends when they are coupled, the first mentioned means comprising threaded bolts arranged to extend longitudinally of the duct.

7. A sectional trolley duct installation comprising trolley duct sections and combined couplers and hangers for adjacent ends of duct sections, each coupler being provided with means manipulable for pulling adjacent section ends towards each other and means operating automatically on manipulation of the first mentioned means for causing the section ends to move transversely of the run of the duct and in the same direction towards a part of the coupler and thus automatically cause exact alignment of the section ends when they are coupled, the second mentioned means comprising inclined wedging surfaces on the sections and on the couplers and arranged to wedge the sections transversely on manipulation of the first mentioned means.

8. A sectional trolley duct installation comprising trolley duct sections and combined couplers and hangers for adjacent ends of duct sections, each coupler being provided with means manipulable for pulling adjacent section ends towards each other and means operating automatically on manipulation of the first mentioned means for causing the section ends to move transversely of the run of the duct and in the same direction towards a part of the coupler and thus automatically cause exact alignment of the section ends when they are coupled, the second mentioned means comprising inclined wedging surfaces on the sections and on the couplers and in the nature of pins and inclined slots and arranged to wedge the sections transversely on manipulation of the first mentioned means.

9. A sectional trolley duct installation comprising trolley duct sections and combined couplers and hangers for adjacent ends of duct sections, each coupler being provided with means manipulable for pulling adjacent section ends towards each other and means operating automatically on manipulation of the first mentioned means for causing the section ends to move transversely of the run of the duct and in the same direction towards a part of the coupler and thus automatically cause exact alignment of the section ends when they are coupled, the first mentioned means comprising threaded bolts arranged to extend longitudinally of the duct, the second mentioned means comprising inclined wedging surfaces on the sections and on the couplers and arranged to wedge the sections transversely on manipulation of the first mentioned means.

10. A sectional trolley duct installation comprising trolley duct sections and combined couplers and hangers for adjacent ends of duct sections, each coupler being provided with means manipulable for pulling adjacent section ends towards each other and means operating automatically on manipulation of the first mentioned means for causing the section ends to move transversely of the run of the duct and in the same direction towards a part of the coupler and thus automatically cause exact alignment of the section ends when they are coupled, the first mentioned means comprising threaded bolts arranged to extend longitudinally of the duct, the second mentioned means comprising inclined wedging surfaces on the sections and on the couplers and in the nature of pins and inclined slots and arranged to wedge the section transversely on manipulation of the first mentioned means.

HARRISON J. L. FRANK.
WILLIAM A. HARPER.